(12) United States Patent
Gross (10) Patent No.: US 9,360,231 B2
(45) Date of Patent: Jun. 7, 2016

(54) INSULATION WINDOW

(71) Applicant: Jeffrey Allan Gross, Lancaster, OH (US)

(72) Inventor: Jeffrey Allan Gross, Lancaster, OH (US)

(73) Assignee: Fabricated Packaging Materials, Inc., Lancaster, OH (US)

( * ) Notice: Subject to any disclaimer, the term of this patent is extended or adjusted under 35 U.S.C. 154(b) by 231 days.

(21) Appl. No.: 13/849,158

(22) Filed: Mar. 22, 2013

(65) Prior Publication Data

US 2014/0272285 A1 Sep. 18, 2014

Related U.S. Application Data

(60) Provisional application No. 61/793,618, filed on Mar. 15, 2013.

(51) Int. Cl.
*B32B 3/24* (2006.01)
*F24H 1/18* (2006.01)
*F28D 20/00* (2006.01)

(52) U.S. Cl.
CPC ............ *F24H 1/182* (2013.01); *F28D 20/0034* (2013.01); *F28F 2270/00* (2013.01); *Y02E 60/142* (2013.01); *Y10T 428/24322* (2015.01)

(58) Field of Classification Search
CPC .............................. F24D 19/1051; F24H 1/182
USPC ....................................................... 428/137
See application file for complete search history.

(56) References Cited

U.S. PATENT DOCUMENTS

| | | | |
|---|---|---|---|
| 2,642,851 A | 6/1953 | McFerran | |
| 4,744,488 A * | 5/1988 | Nelson | 220/567.3 |
| 4,861,968 A | 8/1989 | West | |
| 4,945,892 A | 8/1990 | Chevalier et al. | |
| 5,020,481 A * | 6/1991 | Nelson | 122/494 |
| 5,052,346 A | 10/1991 | Beck | |
| 5,163,119 A | 11/1992 | Windon | |
| 5,293,844 A | 3/1994 | Threatt | |
| 5,299,280 A | 3/1994 | Ruark | |
| 5,711,256 A | 1/1998 | Brandon | |
| 5,899,198 A | 5/1999 | Bradenbaugh | |
| 6,029,615 A * | 2/2000 | Terwilliger et al. | 122/494 |
| 6,588,378 B1 | 7/2003 | Henderson et al. | |
| 6,898,375 B2 | 5/2005 | Henderson et al. | |
| 6,917,756 B2 | 7/2005 | Henderson et al. | |
| 7,027,723 B2 | 4/2006 | Henderson et al. | |
| 7,409,925 B2 | 8/2008 | Lannes et al. | |
| 7,516,721 B2 | 4/2009 | Syler | |
| 2013/0043252 A1 | 2/2013 | Nelson et al. | |

* cited by examiner

*Primary Examiner* — William P Watkins, III
(74) *Attorney, Agent, or Firm* — Porter Wright Morris & Arthur LLP; Ryan Willis (57) ABSTRACT

An insulation window for use with a water heater having a tank and a jacket together at least partially defining a circumferential void therebetween, the insulation window comprising: (a) a rigid polymer core including a continuous wall defining an internal through hole; (b) a first compressible layer overlapping a first side of the continuous wall to delineate a first opening in communication with the through hole; and, (c) a second compressible layer overlapping a second side of the continuous wall to delineate a second opening in communication with the through hole, where the first side of the continuous wall is generally opposite the second side.

9 Claims, 7 Drawing Sheets

INSULATION WINDOW

RELATED ART

1. Field of the Invention

The present invention is directed to insulation and insulation ports and, more specifically, to insulation ports for use with water healers and insulation in any application where thermal transfer is to be retarded.

2. Brief Discussion of Related Art

A water heater may include a water heater tank and a metal water heater jacket that circumferentially surrounds the tank and provides a cover for it. When fabricating a water heater, it is common practice to place insulation between the tank and jacket. Currently, industry practice uses an injected foam insulation that flows like a liquid and expands to fill all available crevices between the tank and jacket. Nevertheless, fiberglass insulation may be used in the alternative.

When manufacturing water heaters, industry practice operatively couples the jacket to the tank prior to the foam insulation being injected. But this creates additional problems as components on the inside of the jacket need to have access ports through the jacket that are unobstructed, whether by insulation or other structures. Consequently, water heater manufacturers have encountered a problem with creating unobstructed access ports to the interior of the water heater without sacrificing the amount of insulation that is packed in between the tank and jacket. More specifically, when the foam insulation is injected between the jacket and tank, this material flows into or expands into all fluidically open areas. Consequently, any significant gap allows the foam insulation to flow therethrough and later expand. In circumstances where unobstructed ports are necessary, such as for electrical connections, expandable foam flowing into these areas is not preferred.

Government energy requirements have mandated that water heaters be more energy efficient. To accomplish this, water heater manufacturers have injected more foam into the cavity between the jacket and tank, and sometimes at higher pressures, which has caused preexisting devices to fail to maintain an unobstructed port to access the interior of the water heater. Consequently, there exists a need for a device to maintain an unobstructed port to the interior of the water heater for use with current fabrication techniques.

In addition, an alternate embodiment is directed to insulation that accommodates irregular sizes. Solid foam insulation is commonly placed in between studs of a building and against or adjacent to the roof of a building to retard thermal transfer through the walls or roof. In certain instances, however, the cavities in the walls or adjacent the roof may not be rectangular or of uniform dimensions. Yet current rigid foam insulation is provided as rectangular sheets that are not easily compressible or reconfigurable (without material removal such as via cutting) to accommodate non-rectangular openings.

When installing rigid foam sheet insulation, one of the major costs is the labor to install the sheets. Accordingly, when workers have to stop and cut the foam sheets to allow the sheets to fit in a non-uniform area, this results in higher labor costs to install the same square footage of insulation when compared to laborers making no or fewer cuts.

In addressing this problem, the alternate exemplary embodiment provides a rigid foam sheet that includes features allowing the sheet to change its outer dimensions to accommodate non-uniform cavities. These features may be present in the vertical dimension, the lateral dimension, and the thickness dimension. As will be discussed in more detail hereafter, these features allow the foam sheets to be compressed within a predetermined amount to accommodate variances in cavities where the foam is installed. Because of these features, laborers installing the insulation need to make fewer cuts to install the insulation when confronted with rectangular or other openings that are non-uniform.

INTRODUCTION TO THE INVENTION

It is a first aspect of the present invention to provide an insulation window for use with a water heater having a tank and a jacket together at least partially defining a circumferential void therebetween, the insulation window comprising: (a) a rigid polymer core including a continuous wall defining an internal through hole; (b) a first compressible layer overlapping a first side of the continuous wall to delineate a first opening in communication with the through hole; and, (c) a second compressible layer overlapping a second side of the continuous wall to delineate a second opening in communication with the through hole, where the first side of the continuous wall is generally opposite the second side.

In a more detailed embodiment of the first aspect, the first side of the rigid polymer core includes a first curvature, the second side of the rigid polymer core includes a second curvature, and the first curvature is greater than the second curvature. In yet another more detailed embodiment, the rigid polymer core includes a thickness equal to a straight line distance between the first side and the second side, the first compressible layer has a thickness less than the thickness of the rigid polymer core, and the second compressible layer has a thickness less than the thickness of the rigid polymer core. In a further detailed embodiment the rigid polymer core comprises an expanded polymer, the first compressible layer comprises at least one of a deformable foam and a fibrous material, and the second compressible layer comprises at least one of a deformable foam and a fibrous material. In still a further detailed embodiment, the expanded polymer comprises expanded polystyrene, the first compressible layer comprises at least one of a polyurethane foam and a polyester fiber, and the second compressible layer comprises at least one of a polyurethane foam and a polyester fiber. In a more detailed embodiment, at least one of the first compressible layer and the second compressible layer includes a repositionable flap in communication with the through hole of the rigid core. In a more detailed embodiment, the rigid core includes a first rectangular profile, the first compressible layer includes a second rectangular profile, and the second compressible layer includes a third rectangular profile. In another more detailed embodiment, the second rectangular profile is greater in height and width than the first rectangular profile, and the third rectangular profile is greater in height and width than the first rectangular profile. In yet another more detailed embodiment, the first compressible layer at least partially overhangs a perimeter of the first side of the rigid polymer core, and the second compressible layer at least partially overhangs a perimeter of the second side of the rigid polymer core. In still another more detailed embodiment the rigid polymer core includes a thickness that is more than three times the thickness of at least one of the first compressible layer and the second compressible layer.

It is a second aspect of the present invention to provide an insulation window for use with a water heater having a tank and a jacket together at least partially defining a circumferential void therebetween, the insulation window comprising: (a) an expanded polymer core including a first surface with a first curvature and a second surface, spaced apart from the first surface, with a second curvature less than the first curvature, the expanded polymer core including an internal through hole; (b) a first layer overlapping the first surface of the expanded polymer core and delineating a first opening in communication with the through hole; and, (c) a second layer overlapping the second surface of the expanded polymer core and delineating a second opening in communication with the through hole, where the first layer and the second layer are more readily compressible than is the expanded polymer core.

In a more detailed embodiment of the second aspect, the expanded polymer core includes a thickness equal to a straight line distance between the first surface and the second surface, the first layer has a thickness less than the thickness of the expanded polymer core, and the second layer has a thickness less than the thickness of the expanded polymer core. In yet another more detailed embodiment, the first layer at least partially overhangs a perimeter of the first surface of the expanded polymer core, and the second layer at least partially overhangs a perimeter of the second surface of the expanded polymer core. In a further detailed embodiment, the expanded polymer core comprises a polymer foam, the first layer comprises at least one of an elastic foam and a fibrous material, and the second layer comprises at least one of an elastic foam and a fibrous material. In still a further detailed embodiment, the polymer foam comprises expanded polystyrene, the first layer comprises at least one of a polyurethane foam and a polyester fiber, and the second layer comprises at least one of a polyurethane foam and a polyester fiber. In a more detailed embodiment, at least one of the first layer and the second layer includes a repositionable flap in communication with the through hole of the expanded polymer core. In a more detailed embodiment, the expanded polymer core includes a first rectangular profile, the first layer includes a second rectangular profile, and the second layer includes a third rectangular profile. In yet another more detailed embodiment, the second rectangular profile is greater in height and width than the first rectangular profile, and the third rectangular profile is greater in height and width than the first rectangular profile. In still another more detailed embodiment, the expanded polymer core includes a thickness that is more than three times the thickness of at least one of the first layer and the second layer.

It is a third aspect of the present invention to provide an insulation window for use with a water heater having a tank and a jacket together at least partially defining a circumferential void therebetween, the insulation window comprising: (a) a polymer foam core including a wall at least partially circumscribing a through hole, the polymer foam core having a first stiffness and having opposed first and second sides, the first side shaped to approximate an arcuate profile of the tank and the second side shaped to approximate an arcuate profile of the jacket, wherein the arcuate profiles have different curvatures; (b) a first layer overlapping at least a portion of a first side of the polymer foam core and at least partially circumscribing the through hole, the first layer at least partially delineating a first opening in communication with the through hole, the first layer having a second stiffness; and, (c) a second layer overlapping at least a portion of a second side of the polymer foam core and at least partially circumscribing the through hole, the second layer at least partially delineating a second opening in communication with the through hole, the second layer having a third stiffness, where the first stiffness is more than ten times as great as at least one of the second stiffness and the third stiffness.

DETAILED DESCRIPTION

The exemplary embodiments of the present disclosure are described and illustrated below to encompass insulation and insulation ports, as well as methods of fabricating and installing insulation and insulation ports. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Referencing FIGS. 3-12, a first exemplary insulation window 100 includes a rigid core 110 mounted to a first compressible layer 120 and a second compressible layer 130. In this exemplary embodiment, the rigid core 110 includes a top wall 112, a bottom wall 114, a right side wall 116, and a left side wall 118. These walls 112, 114, 116, 118 include collectively the following surfaces: a front face 140, a rear face 142, a top outside surface 144, a top inside surface 146, a bottom outside surface 148, a bottom inside surface 150, a left outside surface 152, a left inside surface 154, a right outside surface 156, and a right inside surface 158.

Figure 1:
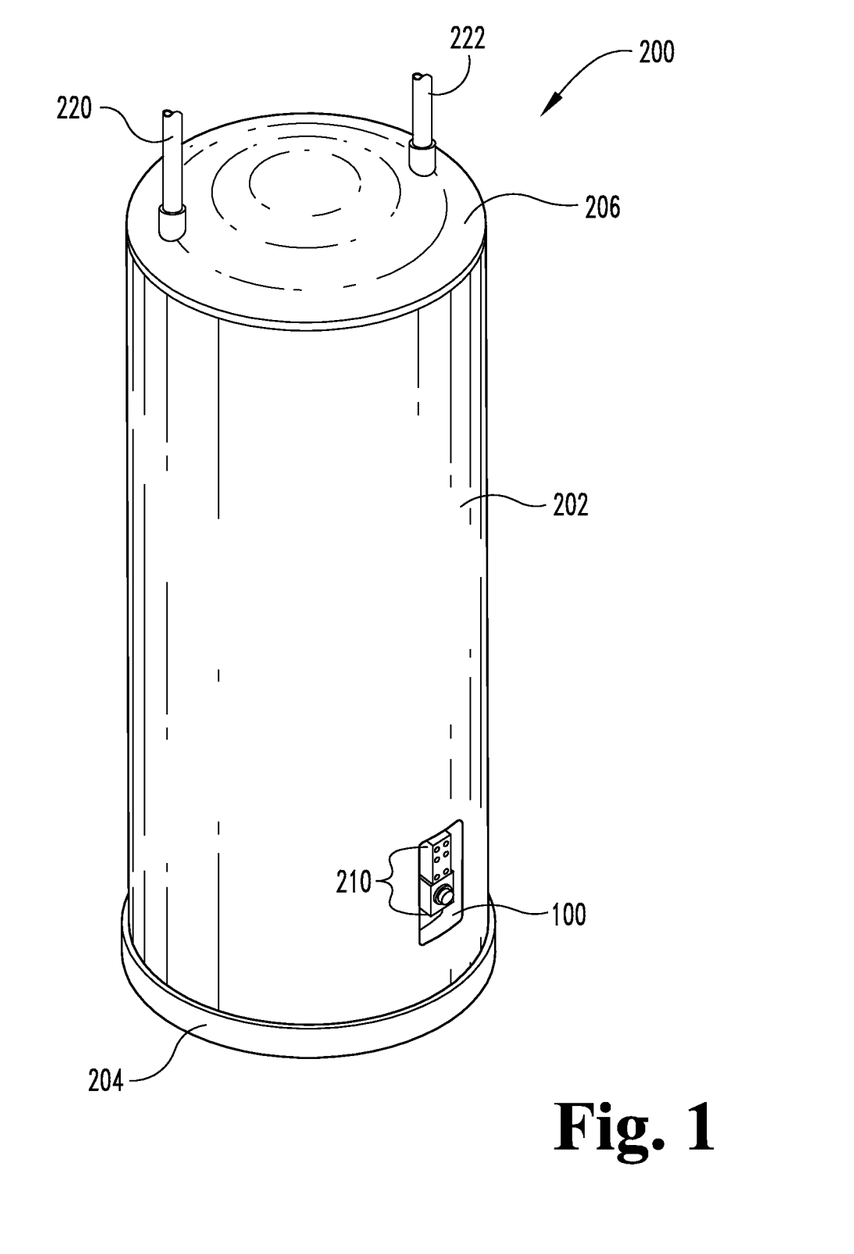
FIG. 1 is an elevated perspective view of a water heater incorporating the exemplary insulation window of the instant disclosure.
Figure 2:
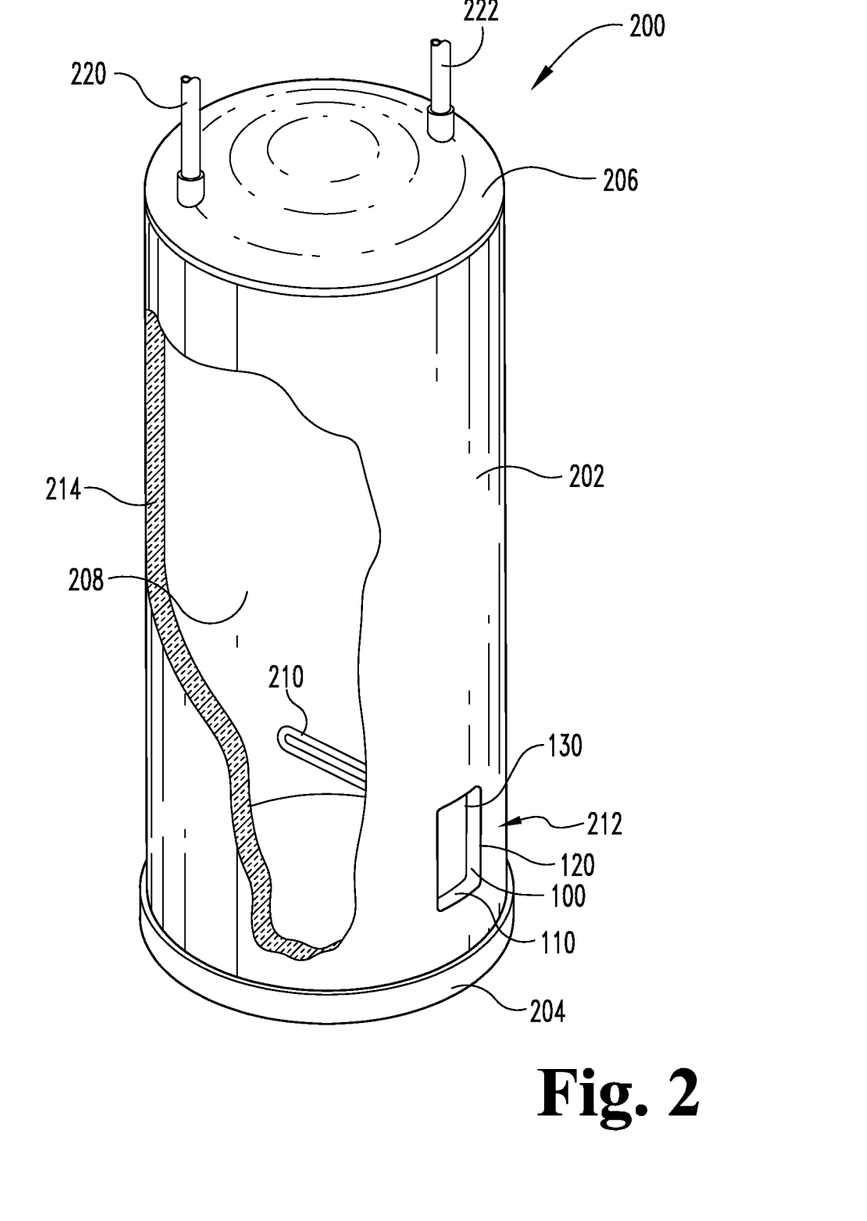
FIG. 2 is an elevated perspective, cut-way view of the water heater of FIG. 1 shown incorporating the exemplary insulation window of the instant disclosure.
Figure 3:
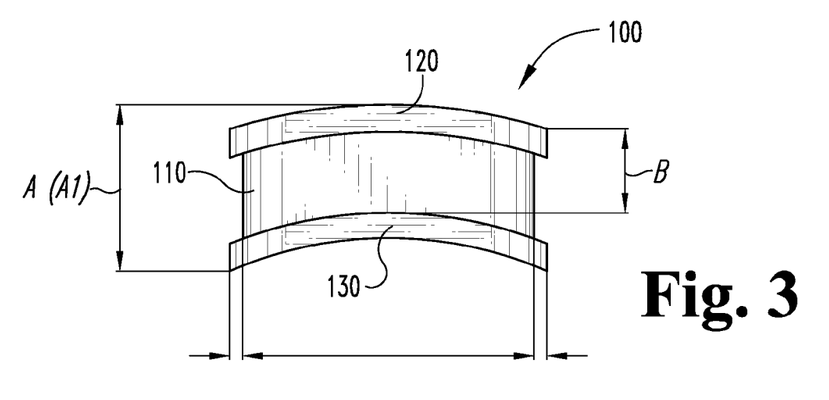
FIG. 3 is a top view of the exemplary insulation window of FIG. 1.
Figure 4:
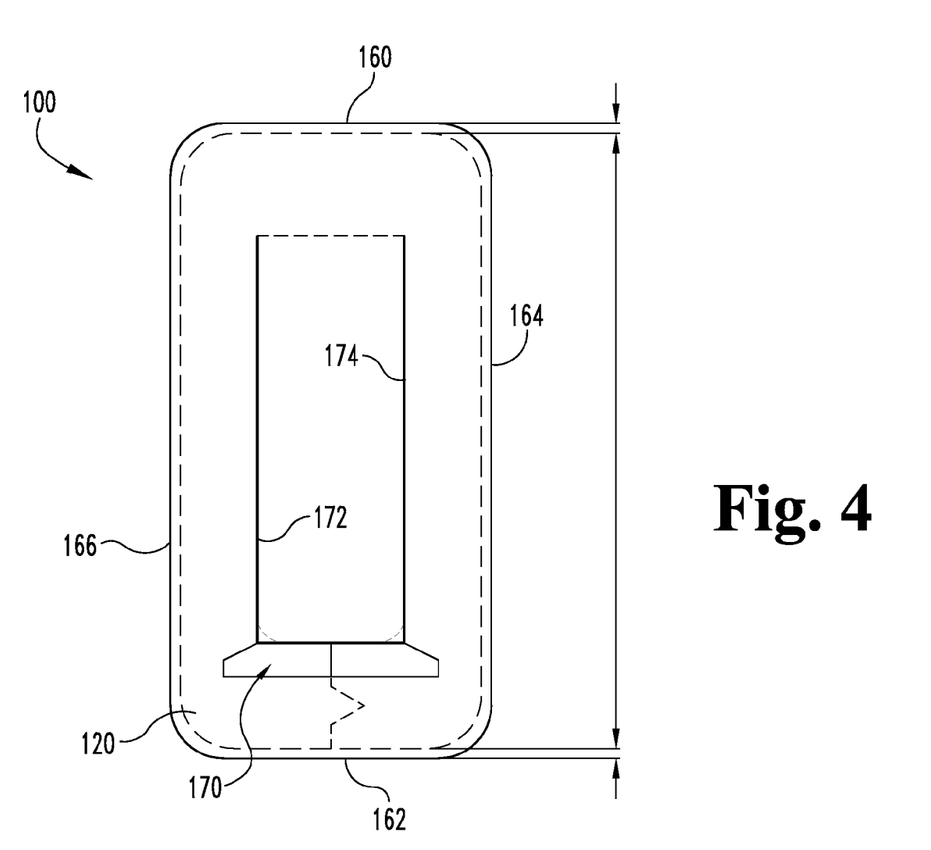
FIG. 4 is a front view of the exemplary insulation window of FIG. 1.
Figure 5:
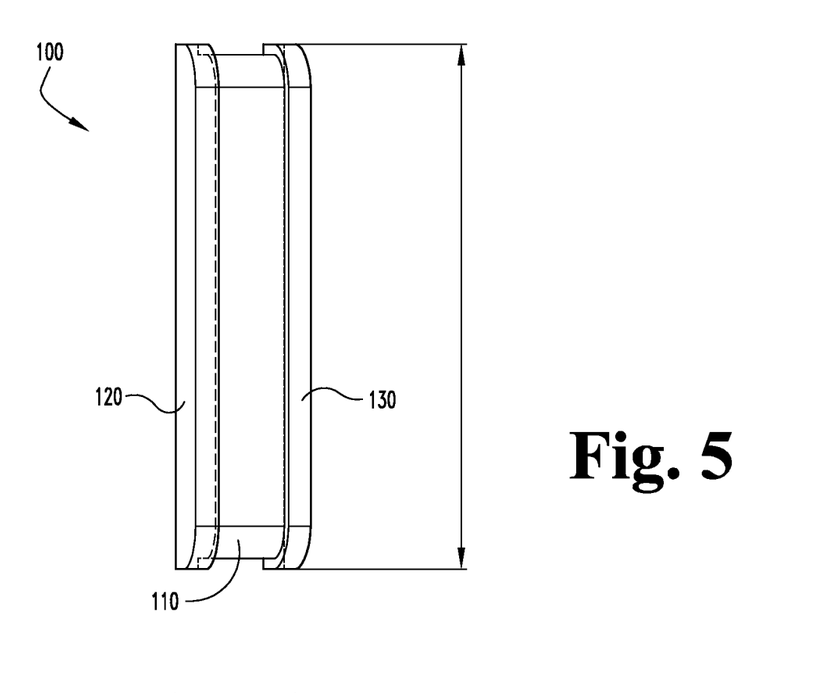
FIG. 5 is a profile view of the exemplary insulation window of FIG. 1.
Figure 6:
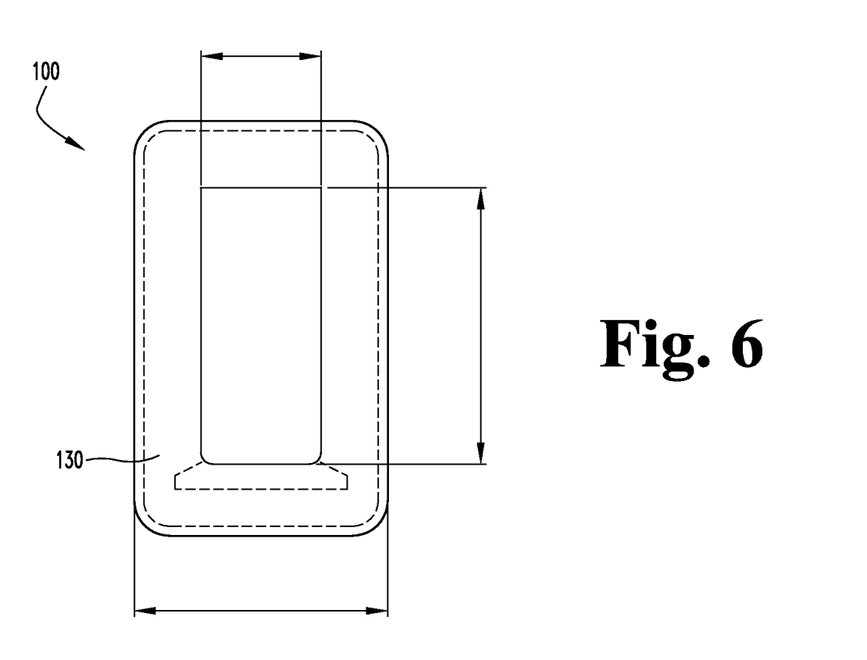
FIG. 6 is a rear view of the exemplary insulation window of FIG. 1.
Figure 7:
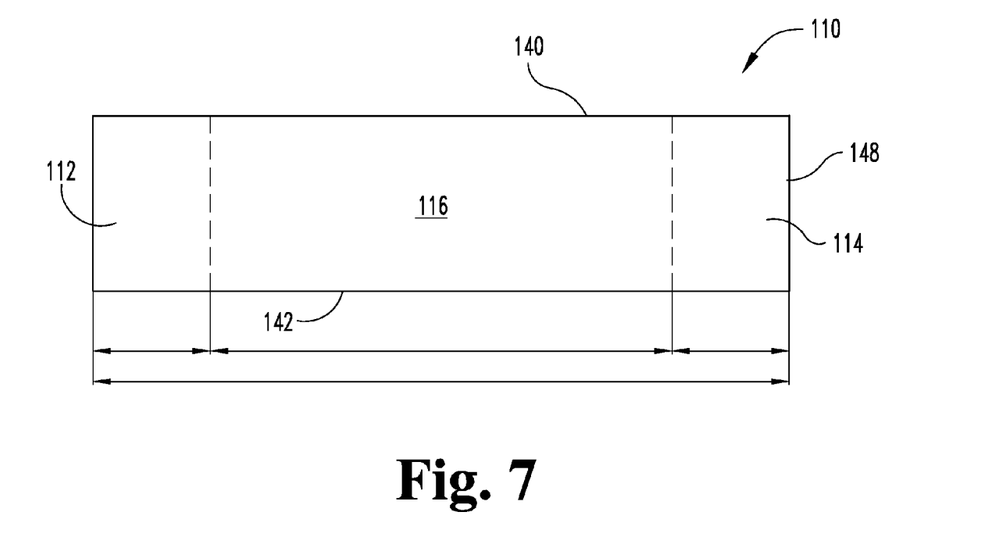
FIG. 7 is a profile view of a rigid core incorporated into the exemplary insulation window of FIG. 3.

The front face 140 is not planar, but is arcuate in profile to match or approximate the arcuate profile or curvature of an interior surface of a water heater jacket 202 (see FIGS. 1 and 2). Similarly, the rear face 142 is not planar, but is arcuate in profile to match or approximate the arcuate profile or curvature of an exterior surface of an inner water tank 208 (see FIGS. 1 and 2). Generally, the curvature of the outside surface of the inner water tank 208 will be greater than the curvature of the inside surface of the water heater jacket 202, hence the curvature of the rear face 142 is larger than the curvature of the front face 140. For purposes of this disclosure, curvature is the amount by which a surface deviates from being flat. It should be noted that the curvature of the front and rear faces 140, 142 may vary depending upon the curvature of the inner water tank 208 and the water heater jacket 202 given that different water heaters use different size inner water tanks and water heater jackets.

The top outside surface 144 includes a planar section that is seamlessly joined to lateral ends that are rounded over to seamlessly join a rounded top edge of the adjoining left and right outside surfaces 152, 156. Similarly, the bottom outside surface 148 includes a planar section (that is parallel to the planar section of the top outside surface) that is seamlessly joined to lateral ends that are rounded over to seamlessly join a rounded bottom edge of the adjoining left and right outside surfaces 152, 156. Moreover, the left and right outside surfaces 152, 156 each include a planar section that is offset from parallel to one another and seamlessly joins the ends that are rounded over. Accordingly, the outside surfaces 144, 148, 152, 156 cooperate to delineate a rectangular outline with rounded corners and an arcuate profile.

The top inside surface 146 includes a planar section that is seamlessly joined to lateral ends that are rounded over to seamlessly join a rounded top edge of the adjoining left and right inside surfaces 154, 158. Similarly, the bottom inside surface 150 includes a planar section (that is parallel to the planar section of the top inside surface) that abuts the left and right inside surfaces 154, 158 via a right angle corner. Moreover, the left and right inside surfaces 154, 158 each include a planar section that is offset from parallel to one another. Accordingly, the inside surfaces 146, 150, 154, 158 cooperate to delineate a rectangular outline with two rounded corners and two right angle corners, all of which having an arcuate profile.

In this exemplary embodiment, the distance between the right and left outside surfaces 152, 156 is approximately 5.875 inches. Nevertheless, this distance may be changed to be greater or less than 5.875 inches. In addition, the distance between the top and bottom outside surfaces 144, 148 is approximately 11.75 inches. Nevertheless, this distance may be changed to be greater or less than 11.75 inches. Moreover, as discussed previously, the distance between the front face 140 and the rear face 142 is intended to vary based open the dimensions of the inner water tank 208, the distance between the inner water tank and the outer jacket 202, and the dimensions of the outer jacket. But in exemplary form, the distance between the front face 140 and the rear face 142 is approximately 1.375 inches. Nevertheless, this distance may be changed to be greater or less than 1.375 inches.

In this exemplary embodiment, the distance between the right and left inside surfaces 154, 158 varies slightly, but is approximately 2.875 inches. Nevertheless, this distance may be changed to be greater or less than 2.875 inches. In addition, the distance between the too and bottom inside surfaces 146, 150 is approximately 8.00 inches. Nevertheless, this distance may be changed to be greater or less than 8.00 inches.

In this exemplary embodiment, the rigid core 110 comprises expandable polystyrene. Nevertheless, other materials may be used to fabricate the rigid core such as, without limitation, any and all expandable polymers and polymer mixtures.

The first compressible layer 120 is mounted to the front face 140 of the rigid core 110, while the second compressible layer 130 is mounted to the rear face 142 of the rigid core. In exemplary form, the compressible layers 120, 130 may be attached to the faces 140, 142 of the rigid core 110 using any number of fastening devices and techniques including, without limitation, ultrasonic welding, adhesives, and heat bonding.

In exemplary form, the first compressible layer 120 comprises a compressible foam or fiber and has a shape that outlines and overlaps the front face 140. More specifically, the first compressible layer includes a rectangular shape with rounded corners that includes a substantially straight top 160, bottom 162, left side 164, and right side 166. In this exemplary embodiment, the top and bottom are substantially parallel to one another and the distance therebetween is approximately 12.00 inches. Nevertheless, this distance may be changed to be greater or less than 12.00 inches. The left side 164 and the right side 166 are substantially parallel to one another, and perpendicular to the top 160 and bottom 162, and the distance therebetween is approximately 6.00 inches. Nevertheless, this distance may be changed to be greater or less than 2.875 inches.

On the interior of the first compressible layer 120 is a cut-out 170 and a pair of slits 172, 174 that extend into the cut-out to form a repositionable flap 178 and stop 1.875 inches from the top 160. In exemplary form, the cut-out 170 is defined by a pentagon outline with a width (from left to right) of approximately 4.25 inches and a height of approximately 0.875 inches. Nevertheless, these distances and dimensions may be changed. Likewise the slits 172, 174 extend vertically and have a length of approximately 8.00 inches from the cut-out 170. Nevertheless, the distance of these slits may be changed to be greater or less than 8.00 inches. The slits 172, 174 are oriented in parallel to one another and have a uniform spacing therebetween of approximately 2.875 inches. Nevertheless, this distance may be changed to be greater or less than 2.875 inches. The thickness of the first compressible layer 120 may vary depending upon the material, as can the other dimensions provided herein, but in exemplary form the thickness is 0.375 inches when using a compressible foam (e.g., polyester foam) or 0.75 inches when using a fiber (e.g., polyester fiber).

In exemplary form, the top 160 of the first compressible layer 120 overlaps the front face top edge of the rigid core between approximately 0.125-0.250 inches, Nevertheless, this distance may be changed to be greater or less than 0.125-0.250 inches. Similarly, the bottom 162 of the first compressible layer 120 overlaps the front face bottom edge of the rigid core 110 between approximately 0.125-0.250 inches. Nevertheless, this distance may be changed to be greater or less than 0.125-0.250 inches. Similarly, the left and right sides 164, 166 of the first compressible layer 120 each overlaps a respective front face right or left edge of the rigid core 110 between approximately 0.125-0.250 inches. Nevertheless, this distance may be changed to be greater or less than 0.125-0.250 inches. More specifically, in a preferred application, the first compressible layer 120 is centered with respect to the front face 140 of the rigid core 110 prior to mounting the first compressible layer to the front face.

The second compressible layer 130 is mounted to the rear face 142 of the rigid core 110 using any number of fastening devices and techniques including, without limitation, ultrasonic welding, adhesives, and heat bonding. In exemplary form, the second compressible layer 130 comprises a compressible foam or fiber and has a shape that outlines and overlaps the rear face 142. More specifically, the second compressible layer 130 includes a rectangular shape with rounded corners that includes a substantially straight top 180, bottom 182, left side 184, and right side 186. In this exemplary embodiment, the top 180 and bottom 182 are substantially parallel to one another and the distance therebetween is approximately 12.00 inches. Nevertheless, this distance may be changed to be greater or less than 12.00 inches. The left side 184 and the right side 186 are substantially parallel to one another, and perpendicular to the top 180 and bottom 182, and the distance therebetween is approximately 6.00 inches. Nevertheless, this distance may be changed to be greater or less than 6.00 inches.

On the interior of the second compressible layer 130 is a cut-out 190 defined by a generally rectangular outline with a width (from left to right) of approximately 2.875 inches and a height (from top to bottom) of approximately 8.00 inches. Nevertheless, these distances and dimensions may be changed.

In exemplary form, the top 180 of the second compressible layer 130 overlaps the rear face top edge of the rigid core between approximately 0.125-0.250 inches. Nevertheless, this distance may be changed to be greater or less than 0.125-0.250 inches. Similarly, the bottom 162 of the first compressible layer 120 overlaps the rear face bottom edge of the rigid core 110 between approximately 0.125-0.250 inches. Nevertheless, this distance may be changed to be greater or less than 0.125-0.250 inches. Similarly, the left and right sides 164, 166 each overlaps a respective rear face right or left edge of the rigid core 110 between approximately 0.125-0.250 inches. Nevertheless, this distance may be changed to be greater or less than 0.125-0.250 inches. More specifically, in a preferred application, the second compressible layer 130 is centered with respect to the rear face 142 of the rigid core 110 prior to mounting the second compressible layer to the rear face.

Figure 8:
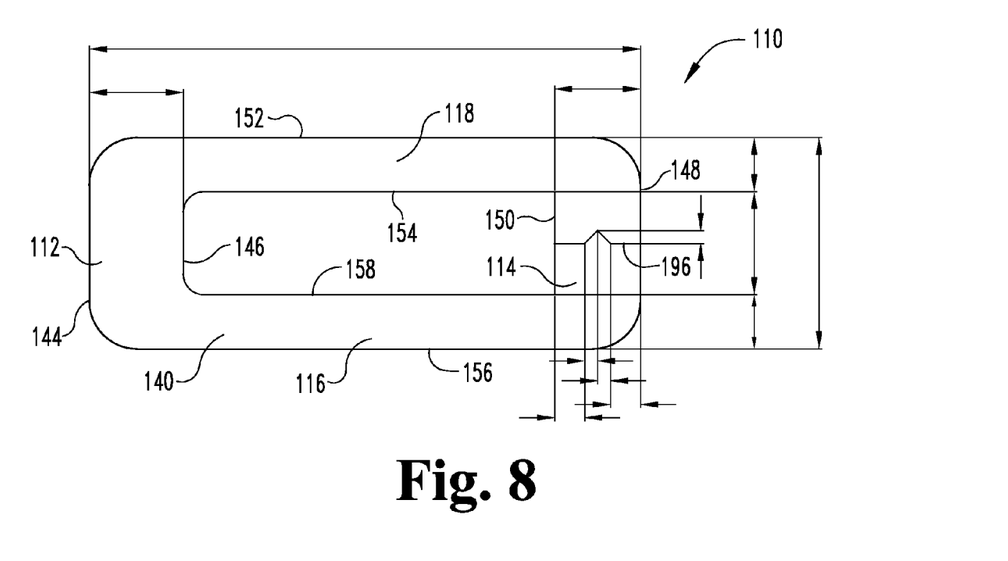
FIG. 8 is a front view of a rigid core incorporated into the exemplary insulation window of FIG. 3.
Figure 9:
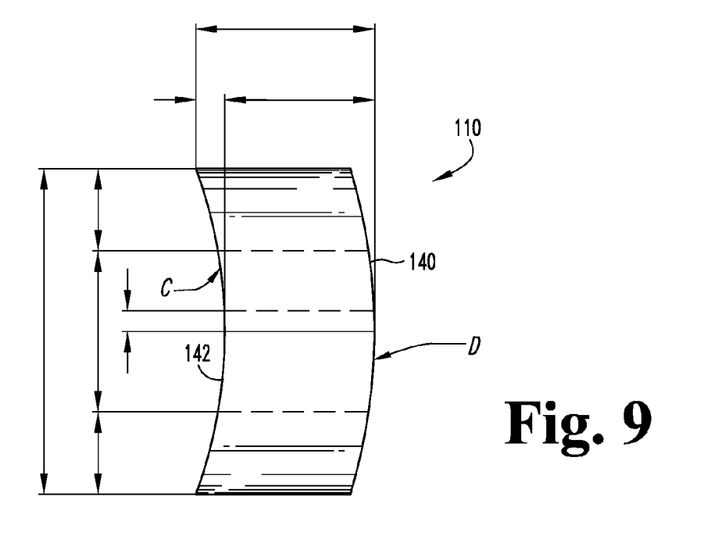
FIG. 9 is a top view of a rigid core incorporated into the exemplary insulation window of FIG. 3.
Figure 10:
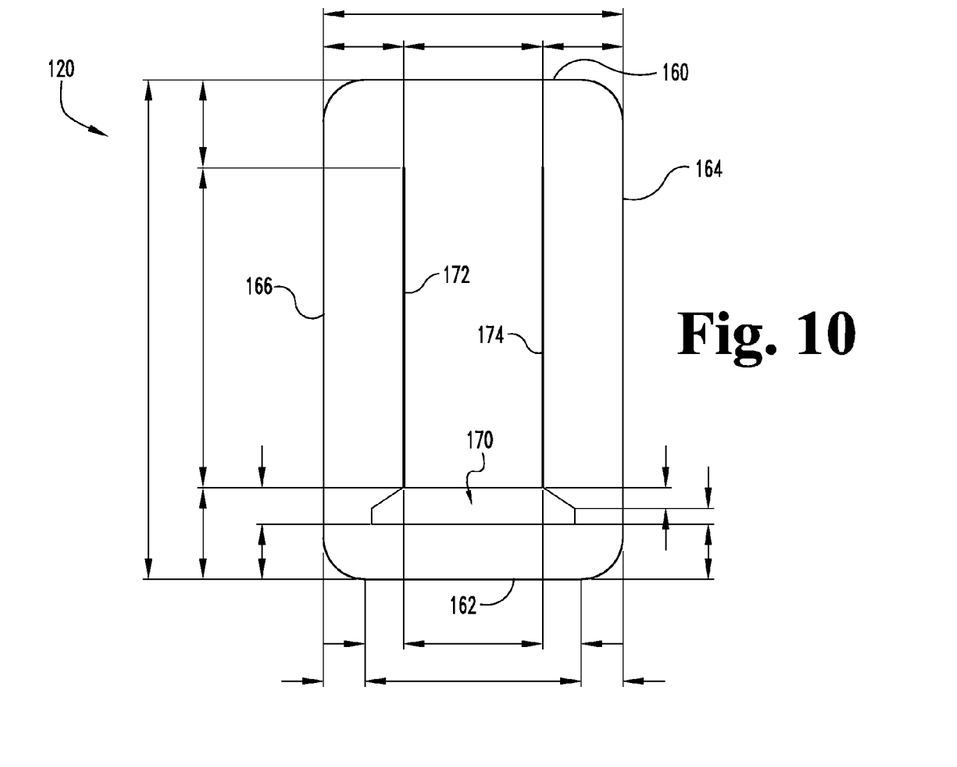
FIG. 10 is a front view of a first compressible layer incorporated into the exemplary insulation window of FIG. 3.
Figure 11:
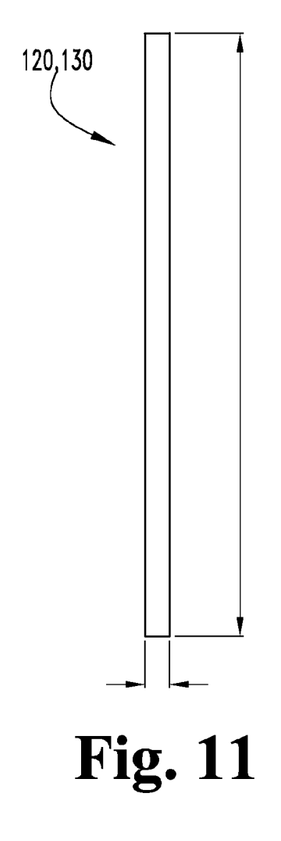
FIG. 11 is a profile view of a first or second compressible layer incorporated into the exemplary insulation window of FIG. 3.
Figure 12:
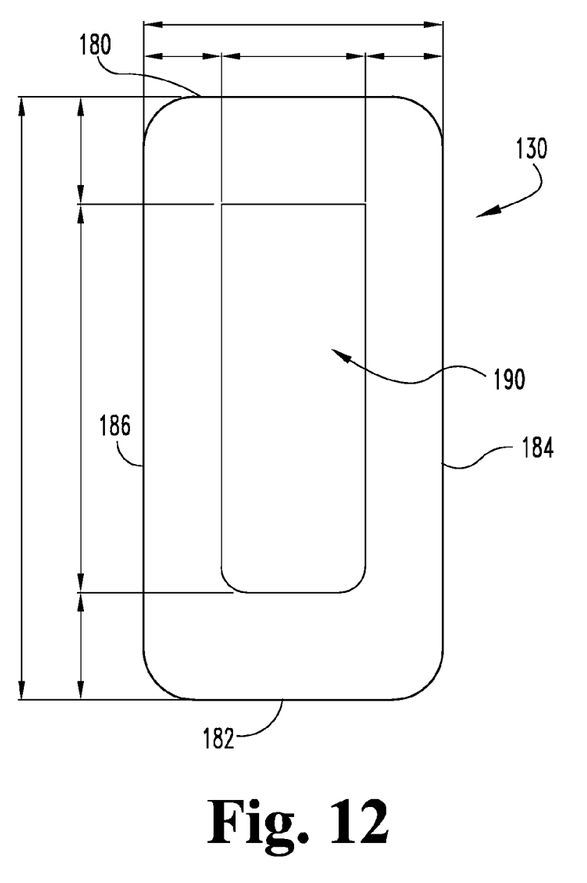
FIG. 12 is a front view of a second compressible layer incorporated into the exemplary insulation window of FIG. 3.

The following is an exemplary procedure that may be used to fabricate the exemplary insulation window 100. A solid block of expandable polystyrene is cut using a hot wire (not shown) via methods known to those skilled in the art to produce a three dimensional tube having the profile of the rigid core 110. More specifically, the three dimensional tube is 11.75 inches wide, 5.875 inches high and has a length at least as great as the thickness of at least one rigid cored 110. In exemplary form, the length is several multiples of the thickness of a single rigid core 110. The three dimensional tube includes an internal opening having the same length and a width of 8.00 inches and a height of 2.875 inches. As shown in FIG. 8, a hot wire opening 196 is formed in order to create the internal opening. The length of the three dimensional time may be multiples of the thickness of the rigid core 110 so that a single three dimensional tube can be used to fabricate multiple rigid cores. Alter the three dimensional tube is formed, this tube is cut into sections, with each section corresponding to an individual rigid core 110. In this process, multiple hot wires are concurrently used to form the front and rear faces 140, 142 of the rigid core 110. After profiling the front and rear faces 140, 142, the rigid core 110 is ready to be mounted to the first and second compressible layers 120, 130.

In exemplary form, the first and second compressible layers 120, 130 are cut out of a larger sheet of material (e.g., a sheet of polyurethane foam or polyester fiber) having a predetermined thickness using a die cutter. As explained above, the thickness may vary based upon the material used to fabricate the first and second compressible layers 120, 130. For purposes of example only, the material comprises polyurethane foam having a thickness of 0.375 inches. The die cutter includes a die having a plurality of cutters with the outlines of the first and second compressible layers 120, 130 as well as internal cutters to cut the slits 172, 174 and the cut-outs 170, 190. After the die cutter has made the requisite cuts in the sheet of material, the first and second compressible layers 120, 130 are removed and prepared for application to the rigid core 110.

In exemplary form, the portion of the compressible layers 120, 130 coming in contact with either the front face 140 or the rear face 142 is applied with a spray-on adhesive. For purposes of discussion, the spray-on adhesive comprising aerosol adhesives such as a styrofoam spray adhesive available from 3M (www.3M.com). After the adhesive has been applied to the compressible layers 120, 130, the layers are aligned with the front and rear faces 140, 142 of the rigid core 110 and pressed so that the layers sandwich the rigid core. This pressure may be applied for a predetermined time to allow the adhesive to cure and maintain a permanent bond between the layers 120, 130 and the rigid core 110.

Referring to FIGS. 1 and 2, the rigid core 110 and the compressible layers 120, 130 are adapted to be incorporated into a water heater 200. More specifically, the water heater 200 includes an outer jacket 202, a bottom pan 204, a top cap 206, and an inner water tank 208 that are mounted to one another. One or more electrical components 210 are associated with the inner water tank 208 including, without limitation, a heating element, a thermostat, and associated wiring. In order to provide access to these electrical components 210 from the exterior of the water heater 200, the outer jacket 202 includes an opening 212. But this opening by itself is ineffective to provide a portal to access the electrical components 210 after insulation is installed.

In exemplary form, after the outer jacket 202, a bottom pan 204, a top cap 206, and an inner water tank 208 that are mounted to one another, a circumferential cavity exists between the inner water tank and the outer jacket. If insulation was placed in this space 214 without some accommodation being made for the electrical components 210, the insulation would cover or obscure access to the electrical components through the opening 212. This is true regardless of whether foam insulation is injected into the space 214 or whether fiberglass insulation is packed into the space. The exemplary insulation window 100 solves these issues and provides a port to access the electrical components 210 via the opening 212, regardless of the insulation present in the space 214.

By way of example, the bottom pan 204 is mounted to the inner water tank 208 and includes a water inlet conduit 220 and hot water outlet conduit 222. Thereafter, the insulation window 100 is position to surround the electrical components 210 (not shown in FIG. 2 through the window 100 for illustration purposes only) extending outward from the inner water tank 208. More specifically, the second compressible layer 130 is positioned against the water tank 208 and the rear face 142 or the rigid core 110 faces the water tank. Likewise, the first compressible layer 120 and front face 140 are directed outward, away from the water tank 208. The outer jacket 202 is then wrapped around the inner tank 208 and the insulation window 100 so that the insulation window is aligned with the opening 212. At the same time, the first compressible layer 120 contacts the interior surface of the outer jacket 202 and the front face 140 of the rigid core 110 faces the interior of the outer jacket. The outer jacket 202 is then mounted to the bottom pan 204 and the top cap 206 is mounted to the outer jacket. Consequently, there is void space 214 in between the outer jacket 202 and the water tank 208, the bottom pan 204, and the top cap 206. But this void space 214 is not in fluid communication with the interior of the insulation window 100 because the insulation window is sandwiched between the outer jacket 202 and the water tank 208 in a manner that is impervious to injected foam. After the outer jacket 202 is mounted to the other components, foam is injected into the void space 214. As the foam is forced into the void space 214, the foam expands and attempts to fill the entirety of the void space. But the perimeter of the insulation window 100 provides a barrier against foam coming into the interior space of the insulation window and contacting the electrical components 210 that may need to be accessed at a later time, such as by personnel installing the water heater 200.

Following from the above description and invention summaries, it should be apparent to those of ordinary skill in the art that, while the methods and apparatuses herein described constitute exemplary embodiments of the present invention, the invention is not limited to the foregoing and changes may be made to such embodiments without departing horn the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An insulation window for use with a water heater having a tank and a jacket together at least partially defining a circumferential void therebetween, the insulation window comprising:
    a rigid polymer core comprising an expanded polymer delineating a rounded, rectangular profile circumscribing an internal through hole;
    a first compressible foam layer overlapping a first side of the rigid polymer core and delineating a rounded, rectangular profile circumscribing a first opening in communication with the through hole; and,
    a second compressible foam layer overlapping a second side of the rigid polymer core and delineating a rounded, rectangular profile to define a second opening in communication with the through hole;
    wherein:
    the first side of the rigid polymer core is generally opposite the second side;
    the rigid polymer core includes a thickness equal to a straight line distance between the first side and the second side;
    the thickness of the rigid polymer core is more than three times a thickness of at least one of the first compressible foam layer and the second compressible foam layer;
    the first compressible foam layer at least partially overhangs a perimeter of the first side of the rigid polymer core by at least one-eighth of an inch;
    the second compressible foam layer at least partially overhangs a perimeter of the second side of the rigid polymer core by at least one-eighth of an inch.

2. The insulation window of claim 1, wherein:
    the expanded polymer comprises expanded polystyrene;
    the first compressible foam layer comprises a polyurethane foam; and,
    the second compressible foam layer comprises a polyurethane foam.

3. The insulation window of claim 1, wherein at least one of the first compressible foam layer and the second compressible foam layer includes a repositionable flap in communication with the through hole of the rigid polymer core.

4. The insulation window of claim 3, wherein at least a portion of the repositionable flap overlaps at least a portion of at least one of the first side and the second side.

5. The insulation window of claim 1, wherein:
    the thickness of the rigid polymer core is approximately 1.375 inches;
    the thickness of the first compressible foam layer is approximately 0.375 inches; and,
    the thickness of the second compressible foam layer is approximately 0.375 inches.

6. A method of fabricating an insulation window for use with a water heater having a tank and a jacket together at least partially defining a circumferential void therebetween, the method comprising:
    cutting an expanded polymer block using a hot wire to create a three dimensional tube;
    cutting the three dimensional tube to create a plurality of rigid polymer cores, each of the plurality of rigid polymer cores delineating a rounded, rectangular profile defining an internal through hole;
    cutting a first compressible foam layer from a first sheet of compressible foam, the first compressible foam layer including a rounded, rectangular profile circumscribing a first opening;
    cutting a second compressible foam layer from a second sheet of compressible foam, the second compressible foam layer including a rounded, rectangular profile circumscribing a second opening;
    adhering the first compressible foam layer to a first side of a first of the plurality of rigid polymer cores, the first compressible foam layer overlapping a perimeter of the first of the plurality of rigid polymer cores by at least one-eighth of an inch and having the first opening in communication with the internal through hole; and,
    adhering the second compressible foam layer to a second side of the first of the plurality of rigid polymer cores, the second compressible foam layer overlapping the perimeter of the first of the plurality of rigid polymer cores by at least one-eighth of an inch and having the second opening in communication with the internal through hole;
    wherein:
    the first side of the first of the plurality of rigid polymer cores is generally opposite the second side;
    the first of the plurality of rigid polymer cores includes a thickness equal to a straight line distance between the first side and the second side; and,
    the thickness of the first of the plurality of rigid polymer cores is more than three times a thickness of at least one of the first compressible foam layer and the second compressible foam layer.

7. The method of claim 6, wherein the act of cutting the three dimensional tube to create a plurality of rigid polymer cores includes using a plurality of hot wires to form the first side and the second side of each of the plurality of rigid polymer cores.

8. The method of claim 6, wherein the act of cutting at least one of the first compressible foam layer and the second compressible foam layer includes forming a repositionable flap, which will be in communication with the internal through hole after at least one of the first compressible foam layer and the second compressible foam layer is adhered to the first of the plurality of rigid polymer cores.

9. The method of claim 8, wherein at least a portion of the repositionable flap overlaps at least a portion of at least one of the first side and the second side.

* * * * *